United States Patent
Matsuoka et al.

[19]

[11] Patent Number: 6,090,025
[45] Date of Patent: Jul. 18, 2000

[54] MACHINE TOOL WITH TOOL SELECTING FUNCTION

[75] Inventors: Nobuyuki Matsuoka, Ichinomiya; Takayuki Koyasu, Chita, both of Japan

[73] Assignee: Brother Kogyo Kabushiki Kaisha, Nagoya, Japan

[21] Appl. No.: 09/282,188

[22] Filed: Mar. 31, 1999

[30] Foreign Application Priority Data

Mar. 31, 1998 [JP] Japan .................................. 10-086974

[51] Int. Cl.[7] ................................................. B23Q 3/157
[52] U.S. Cl. ........................ 483/2; 483/1; 483/4; 483/7; 483/58; 700/179
[58] Field of Search .................................. 483/1, 2, 4, 7, 483/8, 10, 11, 12, 58; 700/179, 188; 318/570, 571

[56] References Cited

U.S. PATENT DOCUMENTS

| | | | |
|---|---|---|---|
| 4,750,105 | 6/1988 | Ohkana et al. | 700/179 |
| 5,404,308 | 4/1995 | Kajiyama | 318/571 X |
| 5,767,644 | 6/1998 | Arimoto et al. | 318/570 |

FOREIGN PATENT DOCUMENTS

| | | | |
|---|---|---|---|
| 360071140 | 4/1985 | Japan | 483/1 |
| 61-0209845 | 9/1986 | Japan | 483/1 |
| 402139149 | 5/1990 | Japan | 483/1 |
| 3-92238 | 4/1991 | Japan . | |
| 3-92239 | 4/1991 | Japan . | |

*Primary Examiner*—William Briggs
*Attorney, Agent, or Firm*—Oliff & Berridge, PLC

[57] ABSTRACT

A machine tool includes a tool magazine for accommodating a plurality of tools, the tool magazine including a tool ejecting section, feeding means for selectively feeding one of the tools accommodated in the tool magazine to the tool ejecting section of the tool magazine, and feed control means for controlling the feeding means so that a feeding speed of the feeding means is set on the basis of a type of a machining operation executed during feed of the tool.

15 Claims, 8 Drawing Sheets

FIG. 1

```
.
.
.
M500
T1        ...SELECTING POT HOLDING TOOL OF TOOL NUMBER 1
G0X-100   ...MOVING MAGAZINE AT HIGH SPEED
G1Y-100   ...MOVING MAGAZINE AT HIGH SPEED
 .
 .
M501
T2        ...SELECTING POT HOLDING TOOL OF TOOL NUMBER 2
G0X-100   ...MOVING MAGAZINE AT LOW SPEED
G0Y-100   ...MOVING MAGAZINE AT LOW SPEED
 .
 .
M502
T3        ...SELECTING POT HOLDING TOOL OF TOOL NUMBER 3
G0X-100   ...MOVING MAGAZINE AT HIGH SPEED
G0Y-100   ...MOVING MAGAZINE AT LOW SPEED
 .
 .
```

FIG. 2

| EXECUTED BLOCK | FUNCTION | PRECISION REQUIRED? |
|---|---|---|
| G0 | POSITIONING | NOT REQUIRED |
| G1 | LINEAR INTERPOLATION | REQUIRED |
| G2 | CIRCULAR INTERPOLATION | REQUIRED |
| G3 | CIRCULAR INTERPOLATION | REQUIRED |
| G4 | DOWELING | NOT REQUIRED |
| G28 | RETURN TO REFERENCE POINT | NOT REQUIRED |
| G131 | MEASUREMENT | REQUIRED |
| G73 | FIXED CYCLE | REQUIRED |
| | | |

MACHINE TOOL WITH TOOL SELECTING FUNCTION

BACKGROUND OF THE INVENTION

1. Field of the Invention

This invention relates to a machine tool provided with a tool magazine for accommodating a plurality of tools and having a tool feeding function of selectively feeding one of the tools to a tool ejecting section of the tool magazine.

2. Description of the Related Art

Machine tool have conventionally been provided which include a tool magazine for accommodating a plurality of tools and have a tool selecting and moving function of selecting and moving one of the tools designated by an DC program to a tool ejecting section of the tool magazine. In these machine tools, when the tool selected and moved to the tool ejecting section has been attached to a spindle, the selection and movement of another tool designated by the MC program is initiated. In the tool selection, the tool is moved or fed to the tool ejecting section independent of a machining operation performed by the machine tool.

Accordingly, the tool selection and movement in sometimes carried out during execution of a machining operation requiring high precision according to a machining command designated by the MC program. The machining operation requiring the high precision includes cutting with movement in which a tool cuts workpiece while the workpiece in being moved. As a result, vibration or oscillation produced in the tool selection adversely affects the high-precision machining operation, thereby reducing the machining precision of workpiece.

To prevent the reduction in the machining precision, the inventors proposed an arrangement for controlling the machine tool so that the tool selection is not performed during execution of the cutting with movement etc. However, most of a machining time is consumed for the cutting with movement in machine tools requiring a high-speed machining. Accordingly, the tool selection can be performed only in a period between the time of completion of the cutting with movement and the time the tool is taken out of the tool magazine. Consequently, a time period required forth tool election results in a loss in the machining time.

SUMMARY OF THE INVENTION

Therefore, an object of the invention in to provide a machine tool in which the reduction in the machining precision resulting from the vibration produced at the time of food of the tool to the tool ejecting section can be prevented and the machining time can be reduced.

The present invention provides a machine tool comprising a tool magazine for accommodating a plurality of tools, the tool magazine including a tool ejecting section, feeding means for effectively feeding one of the tools accommodated in the tool magazine to the tool ejecting section of the tool magazine, and feed control means for controlling the feeding means so that a feeding speed of the feeding means is not on the basis of a type of a machining operation executed during feed of the tool.

According to the above-described machine tool, the precision required for the machining is detained according to its type. The feeding sped at which the tool is fed is automatically set according to the precision. More specifically, when the machining requires high precision, the feeding speed is set at a small value. As a result, the vibration produced by the tool magazine and the feeding means in the feed of the tool can be restrained. Consequently, the tool can be selected and moved concurrently with the machining and without reduction in the machining precision and accordingly, the machining time can be reduced.

In a preferred form, the feed control means controls the feeding means so that a feeding speed of the feeding means is set on the basis of a speed control command contained in an NC program. The tool feeding speed is set to any value on the basis of the NC program Moreover, the tool feeding speed is automatically controlled on the basis of the NC program. Consequently, a more precise adjustment of the tool feeding speed can be realized and the usability of the machine tool can be improved.

In another preferred form, the feed control means is switched between a control of setting the feeding speed on the basis of the type of the machining executed during feed of the tool and a control mode of setting the feeding speed on the basis of a speed control command contained in an NC program. The former control mod is selected when the automatic setting of the tool feeding speed is desired, whereas the latter control mode is selected when a more precise control of the tool feeding speed is desired. Further, when the former control mode has been selected, a speed control command contained in the NC program can be invalidated without a change in the NC program. Consequently, the usability of the machine tool can further be improved.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF THE PREFERRED EMBODIMENT

Figure 7:
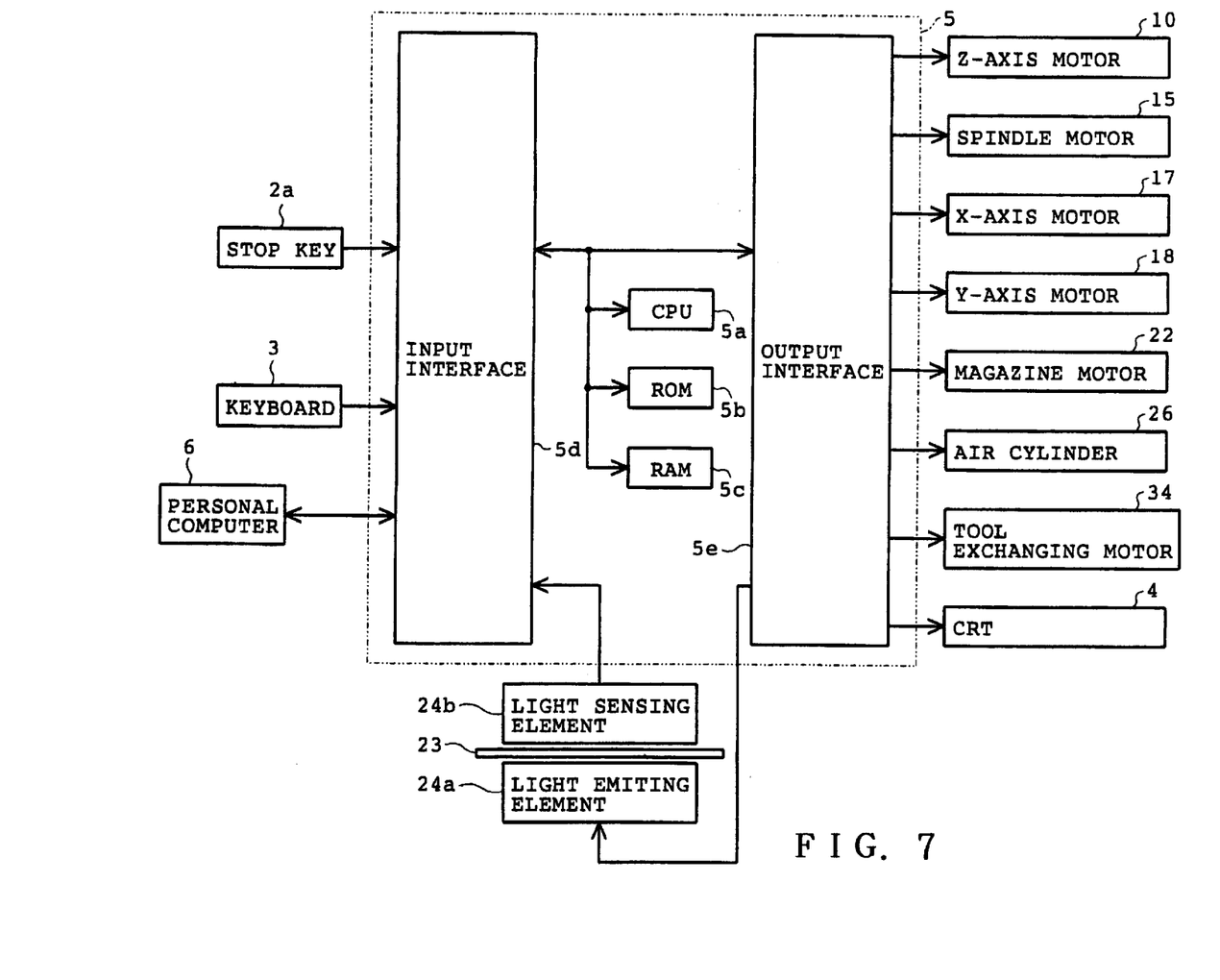
FIG. 7 is a schematic block diagram showing an electrical arrangement.
Figure 8:
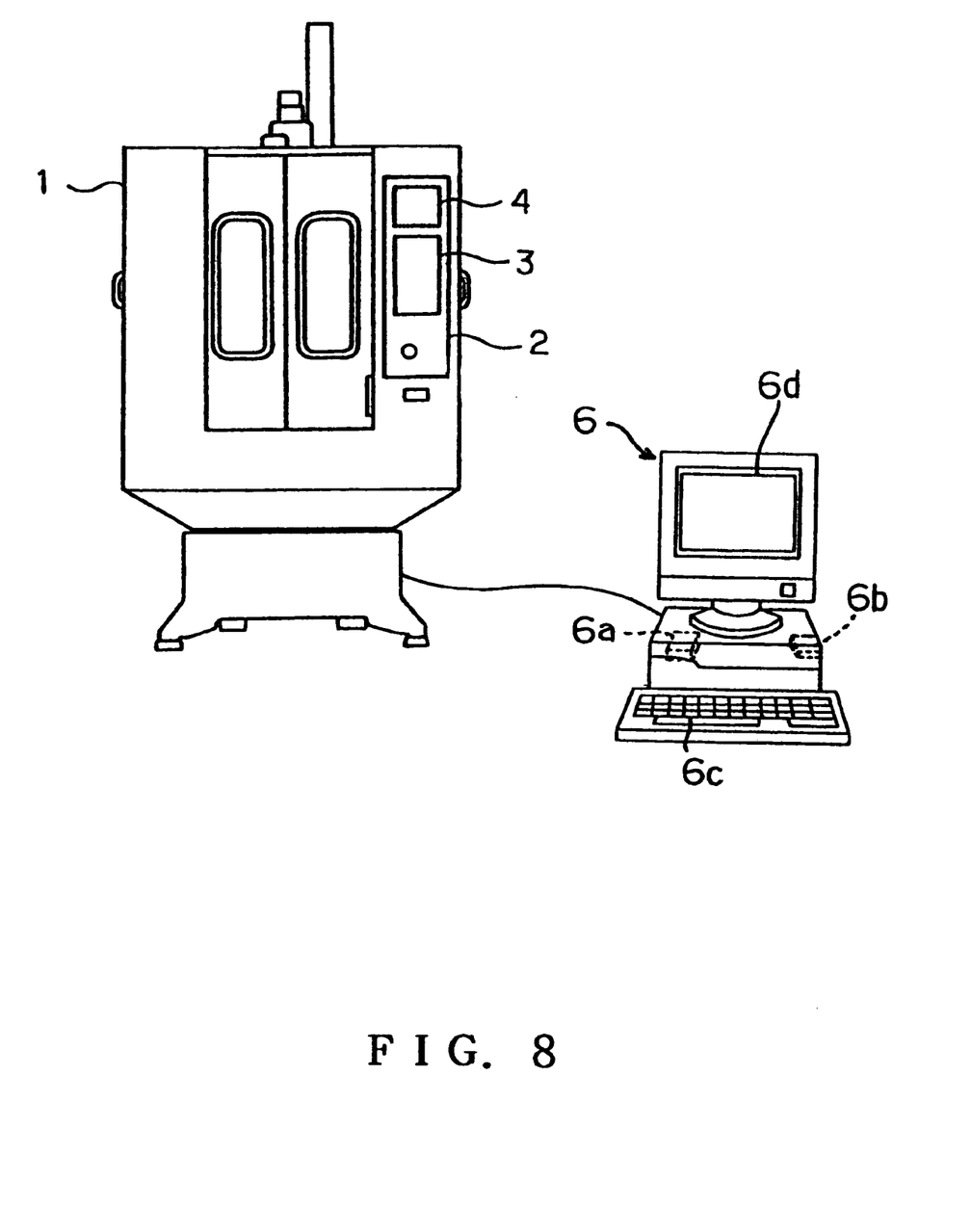
FIG. 8 in a front view of the machine tool.

One embodiment of the present invention will be described with reference to the accompanying drawings. Referring first to FIG. 8, a machine tool of the embodiment is schematically shown. The machine tool includes a splash cover 1 and an operation panel 2 mounted on a front face of the splash cover 1. The operation panel 2 includes a keyboard 3 and a display device, for example, a CRT 4. A control device 5 (see FIG. 7) is provided inside the splash cover 1 for controlling the machine tool. The control device 5 comprises a microcomputer including a CPU 5a, a ROM 5b, a RAM 5c, an input interface 5d and an output interface 5e. The control device 5 constitutes feed control means in the invention.

Referring to FIG. 8, a personal computer 6 is connected to the control device 5. The personal computer 6 includes a microcomputer 6a, a hard disc 6b, a keyboard 6c and a display device, for example, a CRT 6d. A worker previously operates the keyboard 6c to input a plurality of NC programs. Thus, the NC programs are previously stored on the hard disc 6b.

The operation panel 2 is provided with an edit start key (not shown). The edit start key also serves an a key for triggering communication. When detecting operation of the edit start key, the control device 5 requires the personal computer 6 to transfer the NC programs stored on the hard disc 6b. The control device 5 writes the NC programs transferred from the personal computer 6 onto the RAM 5c. Alternatively, the worker may operate the keyboard 3 to directly input the NC program.

Analytical program such an a feeding control program and a speed control program are written on the ROM 5b of the control device 5. Based on the analytical program, the control device 5 analyzes the contents of commands of the NC program written onto the RAN 5c, controlling a machining operation according to the analyzed contents of the commands.

Figure 6:
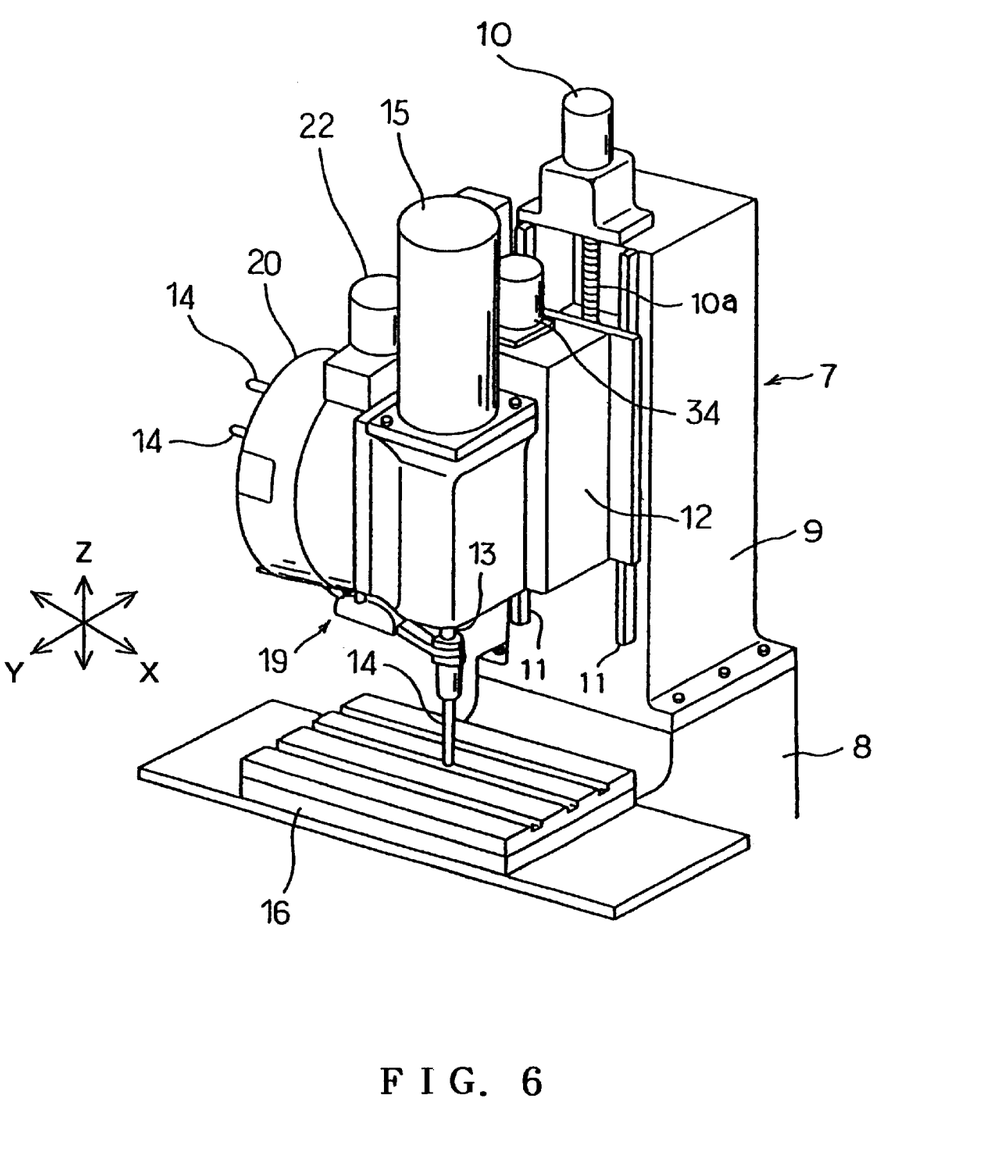
FIG. 6 is a perspective view of a body of the machine tool.

A body 7 of the machine tool is accommodated inside the splash cover 1 as shown in FIG. 6. The machine tool body 7 will be described in detail. The body 7 includes a base 8 on which a column 9 is fixed. A Z-axis motor 10 such as a servomotor is mounted on a top face of the column 9. The Z-axis motor 10 has a rotational shaft to which a food screw 10a is connected. A pair of guide rails 11 are secured to a front page of the column 9. A machining head 12 is mounted on the guide rails 11 so as to be slid vertically. The machining head 12 is engaged with the feed screw 10a so as to be moved in the Z direction along the guide rails 11 when the Z-axis motor 10 is energized to rotate the feed screw 10a.

A machining shaft or a spindle 13 is rotatably mounted on the machining head 12. The spindle 13 has a lower end provided with a downwardly open mounting recess (not shown). A tool 14 is detectably held in the mounting recess. A spindle motor 15 such as a servomotor is mounted on the machining head 12. Upon operation of the spindle motor 15, its rotating force is transmitted to the spindle 13 so that the tool 14 is rotated.

A work table 16 is provided below the machining head 12. The work table 16 is moved in the Z direction and the Y direction by an X-axis motor 17 and a Y-axis motor 18 (see FIG. 7) each comprising a servomotor. The control device 5 controls the aforesaid Z-axis motor 10, the spindle motor 15, the K-axis motor 17 and the Y-azis motor 18 based on the TC program. In the machine tool body 7 constructed as described above, the work table 16 is fed in the X and Y directions and the spindle 13 and accordingly the tool 14 are moved in the Z direction, so that a workpiece (not shown) fixed on the work table 16 is machined.

Figure 4A:
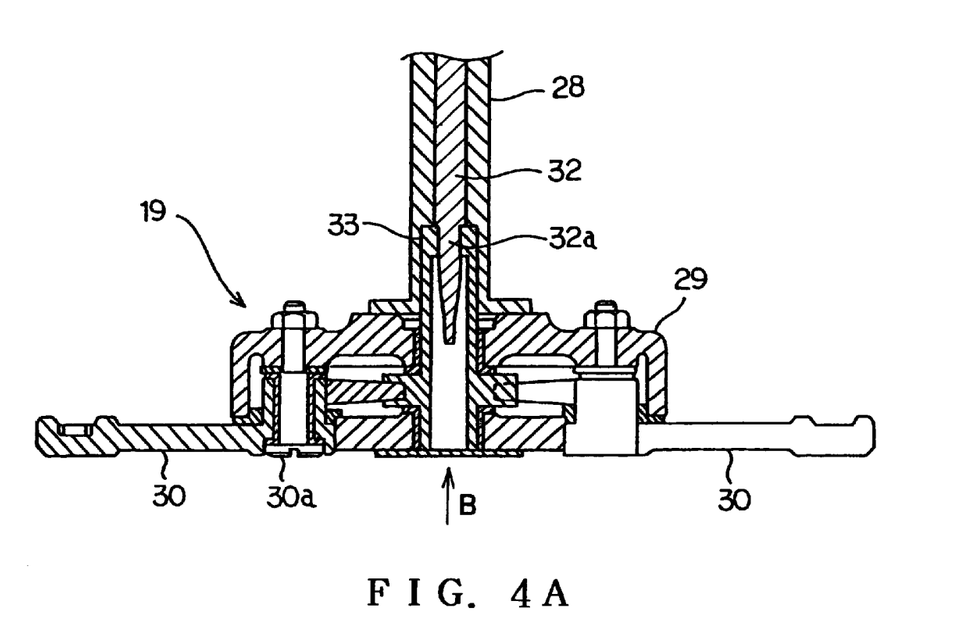
FIGS. 4A and 4B are a partial longitudinal section of a tool exchanger of the machine tool and a view as viewed in the direction of arrow B in FIG. 4A respectively.
Figure 4B:
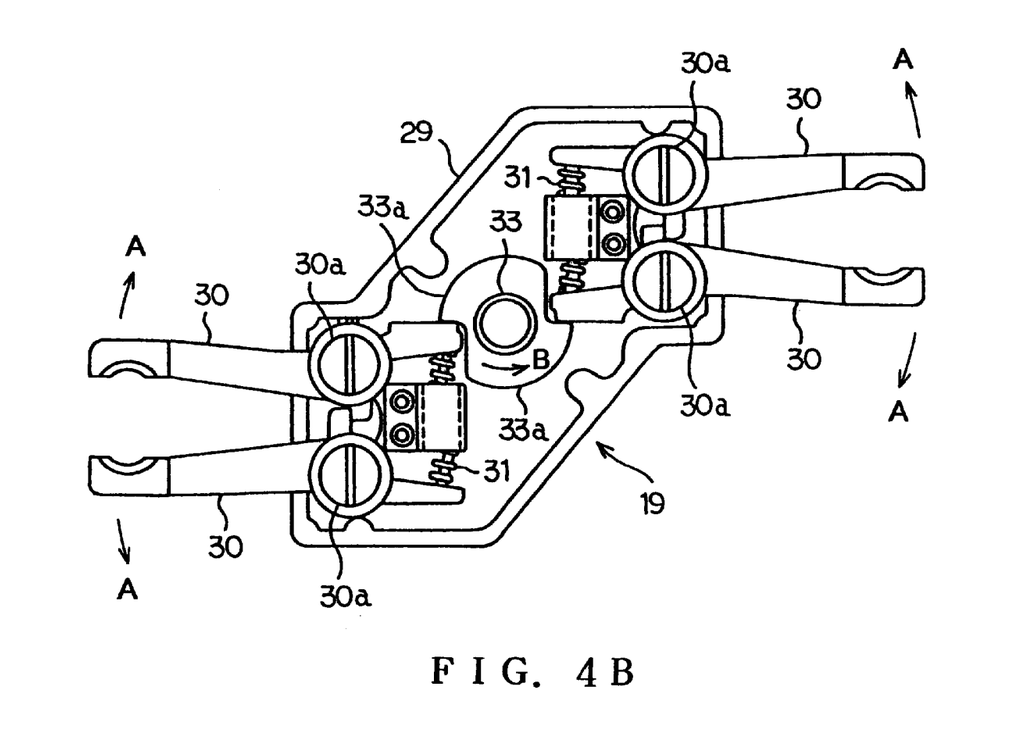
Figure 5:
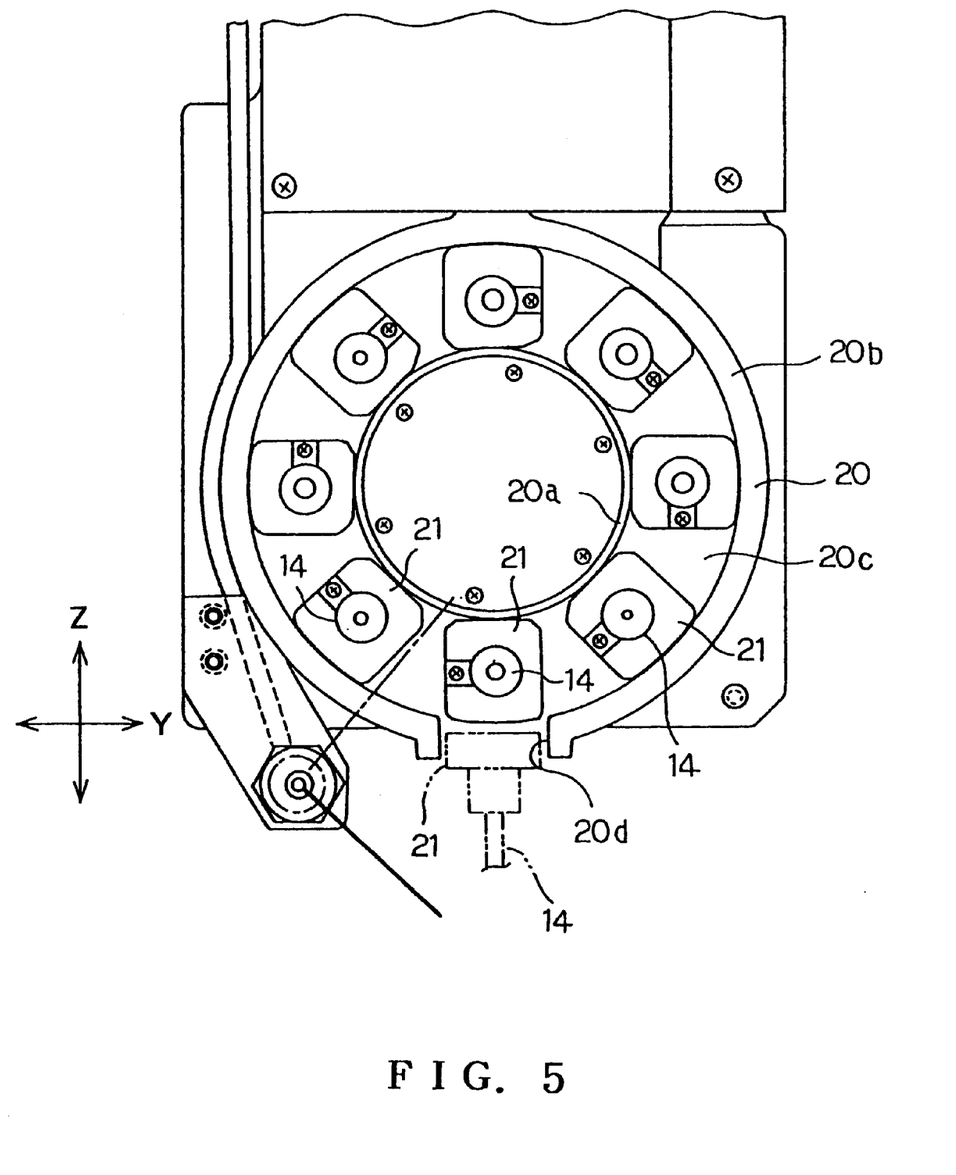
FIG. 5 shows a tool magazine.

A tool exchanger 19 is provided on the machine tool body 7 for automatically exchanging the tool 14 mounted on the spindle 13 to another tool 14. The tool exchanger 19 comprises a tool magazine 20 mounted on the machining head 12, a magazine motor 21 (see FIG. 7), and a rotating arm 29 (see FIG. 4) which will be described later. As shown in FIG. 5, the tool magazine 20 includes an inner cylinder 20a, an outer cylinder 20b and an annular tool passage 20c defined between the cylinders 20a and 20b. An annular conveyor (not shown) is disposed in the tool passage 20c. A plurality of holding pots 21 are rotatably mounted on the conveyor. The holding pots 21 have respective mounting recesses (not shown) in which different types of tools 14 are detectably held.

The tool magazine 20 is provided with a tool selecting section 20d constituting a tool ejecting section in the invention. The tool selecting section 20d has an upper end communicating with the tool passage 20c and a lower end communicating with the outside of the tool magazine 20. The conveyor of the tool magazine 20 is rotated along the annular tool passage 20c when the magazine motor 22 is driven, so that the holding pots 21 are fed in the tool passage 20c. Accordingly, the magazine motor 22 and the conveyor constitute feeding means in the invention.

A tool number of the holding pot 21 fed to the tool selecting section 20d is detected as follows. A tool detecting plate 23 shown in FIG. 7 is rotated together with the aforesaid conveyor. The tool detecting plate 23 has a window (not shown) for every holding pot 21. Each window includes a plurality of slits. The number of slits and the circumferential width differ from one window to another. A light-emitting element 24a and a light sensing element 24b are fixedly disposed so as to interpose the tool detecting plate 23. Light emitted from the light emitting element 24a is projected onto the tool detecting plate 23. The light sensing element 24b senses the light passing through the window of the tool detecting plate 23 to deliver a detection signal.

On the ROM 5b of the control device 5 are written data of signal aspects of the detection signal from the light sensing element 24b and tool numbers "1" to "N" correlated with the respective signal aspects. Based on the detection signal from the light sensing element 24b and the data of correlation written on the ROM 5b, the control device 5 specifies the tool number of the holing pot 21 fed to the tool selecting section 20d.

The following is a brief description of a manner of controlling a feeding speed at which the holding pot 21 (the tool 14) in fed in the tool magazine 20, namely, the speed control of the magazine motor 22. Magazine speed control commands "M500," "M501" and "M502" contained in the NC program are used for the speed control of the magazine motor 22. The control device 5 sets the control mode to a high-speed mode when executing the magazine speed control command "M500" corresponding to a high-speed mode setting instruction during the execution of the NC program. When executing, under the high-sped mode, a tool selecting command which will be described later, the control device 5 drives the magazine motor 22 at a high speed so that the plurality of holding pots 21 are moved at the high speed along the tool passage 20c. Further, the control device 5 sets the control mode to a low-speed mode when executing the magazine speed control command "M501" corresponding to a low-speed mode setting instruction during the execution of the NC program. The control device 5 drives the magazine motor 22 at a low speed upon execution of the tool selecting command. Additionally, the control device 5 sets the control mode to an automatic mode when executing the magazine speed control command "M502" corresponding to an automatic mode setting instruction. The control device 5 executes the tool selecting command under the automatic mode, automatically setting the magazine motor 22 to the high speed or the low speed according to a machining command which will subsequently be executed.

The speed of the magazine motor 22 is also controlled by the selection of magazine control command valid/invalid mode switched according to the contents of operation of the keyboard 3 or 6c before start of the machining. More specifically, the control device 5 invalidates the magazine speed control commands "M500" and "M501" contained in the NC program under a magazine control command invalid mode. On the other hand, the control device 5 validates the magazine speed control commands "M500" and "M501" under a magazine control command valid mode. The speed control of the magazine motor 22 (namely, the tool 14) will be described in detail later.

The NC program contains tool selecting commands such as "T2." The numeral "2" of the tool selecting command "T2" designates a tool number. Upon execution of the tool selecting command, the control device 5 controls drive of the magazine motor 22 so that the holding pot 21 designated by the tool number specified by the tool selecting command is placed opposite to the tool selecting section 20d.

The tool magazine 20 is provided with a well-known pot rotating mechanism (not shown). The pot rotating mechanism includes an air cylinder 26 (see FIG. 7) serving as a drive source. When the tool 14 specified by the NC program has been fed to the tool selecting section 20d, the control device 5 drives the air cylinder 26 to actuate the pot rotating mechanism. Then, a predetermined holding pot 21 is rotated relative to the conveyor as shown by two-dot chain line in FIG. 5, so that the tool 14 specified by the tool selecting command is caused to project through the tool selecting section 20d downward. This tool selecting operation from the rotation of the holding pot 21 to the projection of the tool 14 is executed according to the feed control program stored on the ROM 5b.

When detecting a predetermined operation onto the keyboard 3 of the operation panel 2, the control device 5 displays on the CRT 4 of the operation panel 2 a setting screen for a magazine high-speed movement speed Sh and a magazine low-speed movement speed Sl. The magazine high-speed and low-speed movement speeds Sh and Sl indicate a moving speed of the holding pot 21 under a high-speed mode and a moving sped of the holding pot 21 under a low-speed mode respectively. The magazine low-speed movement speed Sl may be zero. When the keyboard 3 is operated in a state where this speed setting screen is on display by the CRT 4, the control device 5 sets an input value according to the operation onto the keyboard 3 an the magazine high-speed or low-speed movement speed Sh or Sl.

Data of standard magazine high-speed and low-speed movement speeds Sh and Sl is stored on the ROM 5b of the control device 5. When neither magazine high-speed nor low-speed movement speed Sh nor Sl in set through the keyboard 3, the control device 5 moves the holding pot 21 on the basis of the standard high-speed or low-speed movement speed Sh or Sl. Further, the magazine high-speed and low-speed moment speeds Sh and Sl can be input through the keyboard 6c of the personal computer 6.

Exchange of the tool 14 on the spindle 13 to another tool 14 will now be described with reference to FIGS. 4A and 4B. The construction of a tool exchange arm and the construction and arrangement of a movement transmission apparatus (not shown) serving as a driving mechanism are the same as those disclosed in Japanese unexamined patent publication Nos. 3-92239 (1991) and 3-92239 (1991). More specifically, a hollow arm-rotating shaft 29 is mounted on the machining head 12 so an to be rotatable and vertically movable as shown in FIG. 4A. A rotating arm 29 is fixed to a lower end of the arm-rotating shaft 28. The rotating arm 29 has opposite ends on which two pairs of fingers 30 are provided respectively as shown in FIG. 4D. Each finger 30 is mounted on a rotating shaft or bolt 30a so as be rotatable thereabout. Compression coil springs 31 are interposed between the paired fingers 30 respectively. Each compression coil spring 31 urges the fingers 30 in a closing direction or a direction opposite to arrow A in FIG. 4B.

A central shaft 32 is accodated in the arm-rotating shaft 28 as shown in FIG. 4A. The central shaft 32 has an upper end rotatably supported on the machining head 12 and a lower end formed with a narrow engagement portion 32a. A hollow can shaft 33 is rotatably attached to the rotating arm 29. The can shaft 33 engages the engagement portion 32a of the central shaft 32 when the rotating arm 29 and the can shaft 33 are moved to an upward origin together with the arm rotating shaft 28.

The can shaft 33 has two cam portions 33a for on its outer periphery as shown in FIG. 4I. Each paired fingers 30 are closed by the spring force of the compression coil spring 31 when a can follower of one finger 30 of each pair gets into a groove portion between the can portions 33a. When the can follower of one finger 30 of each pair engages the cam portion 33a, the fingers 30 are rotated in the directions of arrows a against the spring force of the compression coil spring 31, whereupon the fingers of each pair are opened.

The arm rotating shaft 28 is connected via the movement transmission mechanism to a tool exchange motor 34 (see FIG. 7). The movement transmission mechanism includes a cam mechanism for transmitting the rotating force of the tool exchange motor 34 to the arm rotating shaft 28, a can mechanism for transmitting the rotating force of the tool exchange motor 34 to the central shaft 32, and a crank mechanism for converting the rotating force of the tool exchange motor 34 to vertically linear movement and transmitting the vertically linear movement to the arm rotating shaft 28. In an initial state of the tool exchange, the arm rotating shaft 28 assumes the upward origin and the can shaft 33 is in engagement with the engagement portion 32a of the central shaft 32 an shown in FIG. 4a. Further, one finger 30 of each pair of fingers is in engagement with the cam portion 33a of the cam shaft 33 such that the fingers 33 of each pair are opened.

The control device 5 drives the tool exchange motor 34 when the tool 14 designated by the tool selecting command has been selected to the tool selecting section 20d. The rotating force of the tool exchange motor 34 is transmitted from the can mechanism to the central shaft 32, rotating it. As a result, the rotating fore* of the central shaft 32 is transmitted via the engagement portion 32a to the can shaft 33, rotating it in the direction of arrow B in FIG. 4B. Upon rotation of the cam shaft 33 in the direction of arrow B, each cam portion 33a passes one finger 30 of each pair so that one finger 30 of each pair gets into the groove portion between the cam portions 33a. One finger 30 of each pair is then rotated by the spring force of the compression coil spring 31 in the direction opposite arrow A, so that the fingers 30 of each pair are closed together. As a result, one paired fingers 30 grip the tool 14 on the spindle 13, whereas the other paired fingers 30 grip another tool 14 projecting from the tool selecting section 20d. Successively, the rotating force of the tool exchange motor 34 is transmitted via the crank mechanism to the arm rotating shaft 28 so that the arm rotating shaft 28 is descended from the origin. The rotating arm 29 is descended together with the arm rotating shaft 28 such that the cam shaft 33 is disengaged from the engagement portion 32a of the central shaft 32. With this, one paired fingers 30 are descended while holding the tool 14 on the spindle 13, whereas the other paired fingers 30 are descended while holding said another tool 14. An a result, the tools 14 are pulled out of the mounting recesses of the spindle 13 and the holding pot 21 respectively.

When the tools 14 have been pulled out of the spindle 13 and the holding pot 21 respectively, the rotating force of the tool exchange motor 34 is transmitted via the can mechanism to the arm rotating shaft 28, so that the rotating arm 29 is rotated 180 degrees together with the arm rotating shaft 28. The fingers 30 gripping the tool 14 at the spindle side are moved beneath the tool selecting section 20d, whereas the other fingers 30 gripping the tool 14 at the holding pot side are moved beneath the spindle 13. Then, the rotating force of the tool exchange motor 34 is transmitted via the crank mechanism to the arm rotating shaft 28 so that the rotating arm 29 in ascended together with the arm rotating shaft 28. As a result, the cam shaft 33 of the rotating arm 29 engages the engagement portion 32a of the central shaft 32. With this, the one paired fingers 30 are ascended toward the mounting recess of the holding pot 21 while gripping the tool 14, whereas the other paired fingers 30 are ascended toward the mounting recess of the spindle 13. Consequently, the tool 14 having been pulled out of the tool selecting section 20d is thrust into the mounting recess of the spindle 13 and the tool 14 at the spindle side is thrust into the mounting recess of the holding pot 21.

Successively, the rotating force of the tool exchange motor 34 is transmitted via the cam mechanism to the central shaft 32 so that the central shaft is rotated. The rotating force of the central shaft 32 is then transmitted via the engagement portion 32a to the can shaft 33 so that the cam shaft is rotated. Upon rotation of the can shaft 33, each can portion 33a thereof engages one finger 30 of each pair. As a result, each paired fingers 30 are returned to an open state.

Figure 1:
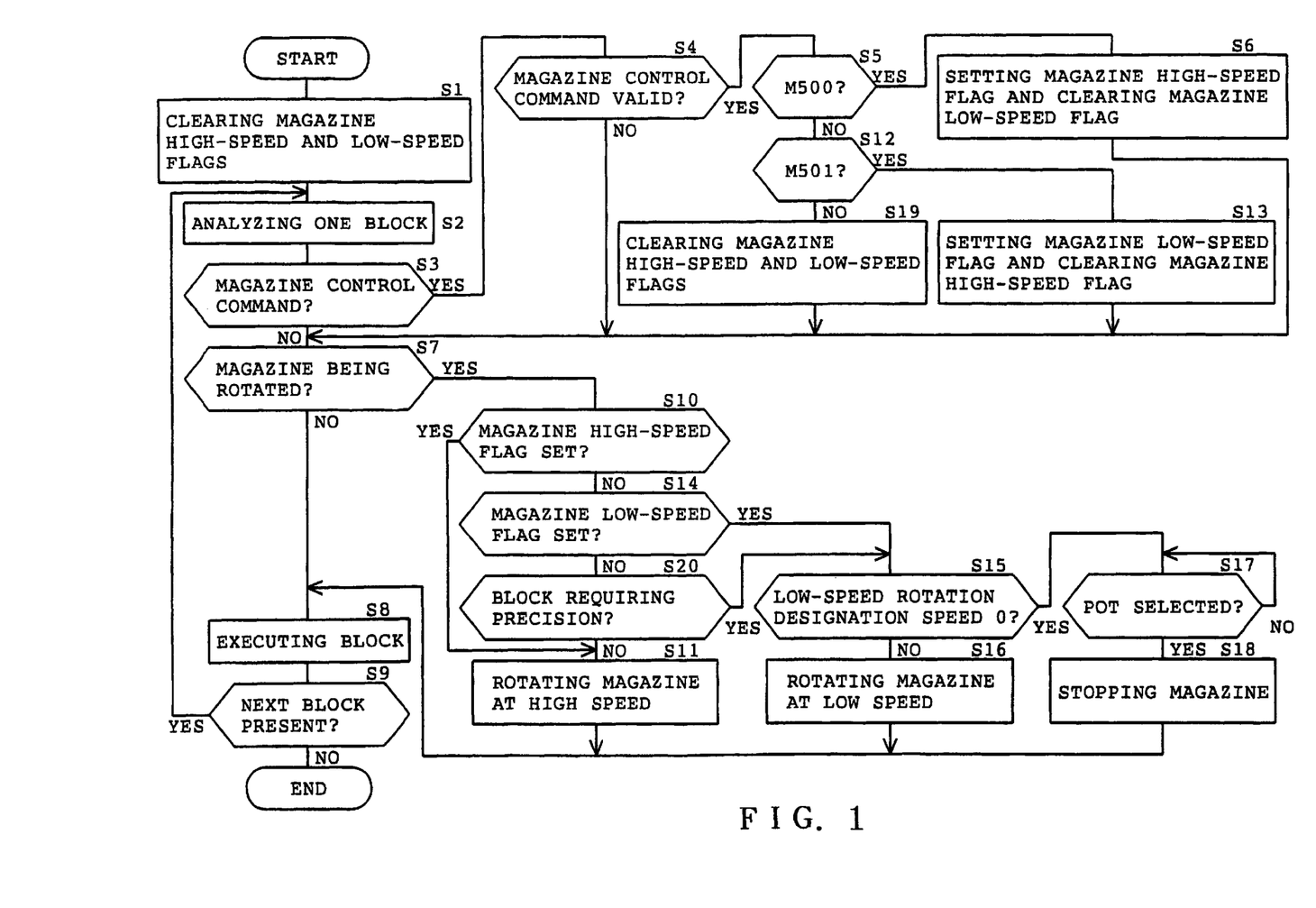
FIG. 1 is a flowchart showing the contents of a speed control program for a magazine motor in a machine tool of one embodiment in accordance with the present invention.
Figure 2:
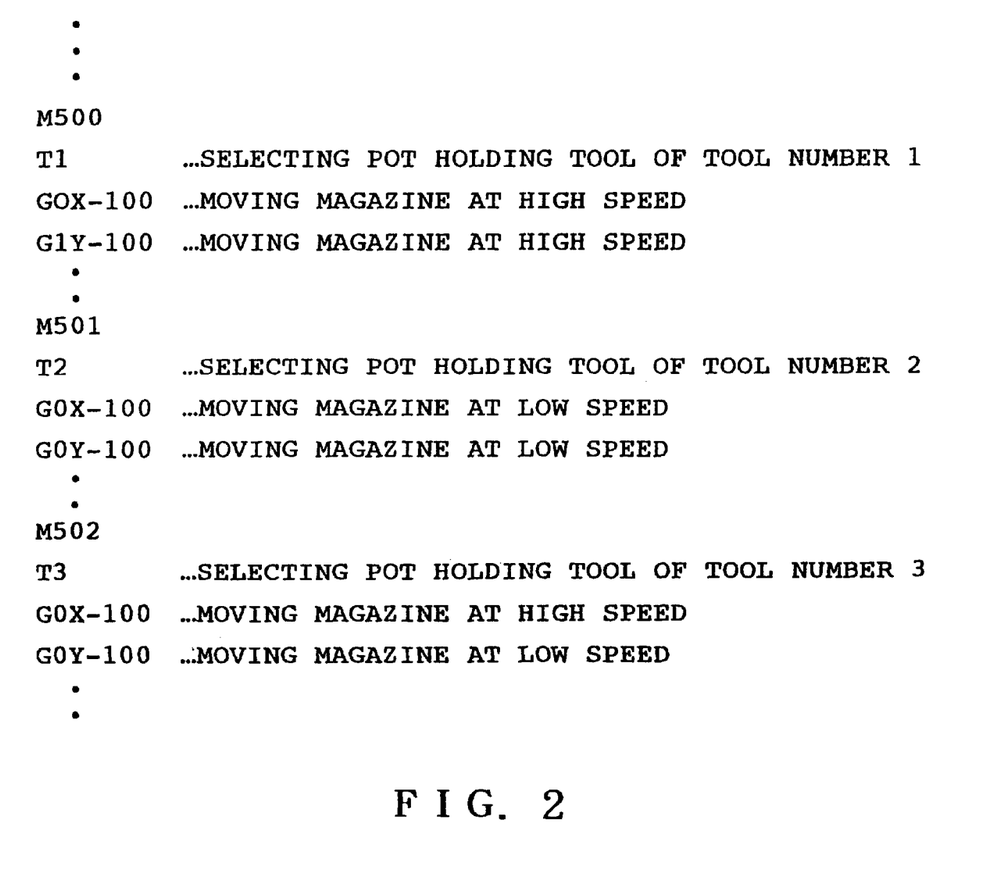
FIG. 2 shows an NC program.

The speed control program for controlling the feed speed of the tool 14 in the tool magazine 20 will now be described with reference to FIGS. 1 and 2. The speed control program in a program for analyzing the NC program and is stored on the ROM 5b of the control device 5. The CPU 5a of the control device 5 operates based on the speed control program so that the control device 5 determines the feed speed of the tool 14 according to the met magazine speed control instruction or the set magazine control valid/invalid mode contained in the NC program. Upon initiation of analysis and execution of the NC program shown in FIG. 2, the control device 5 or the CPU 5a thereof carries out an initializing process to clear a magazine high-speed flag F1 and a magazine low-speed flag F2 at step S1. Advancing to step S2, the control device 5 analyzes block "M500." The control device 5 further advances to step S3 to determine what the block "M500" is, among "M500," "M501" and "M502." In this case, the control device 5 determines in the affirmative ("YES") at step S3, advancing to step S4.

At step S4, the control device 5 determines whether the magazine speed control command "M500" in the NC program is valid. For example, when the magazine control command valid mode has been set, the control device 5 determines in the affirmative, advancing to step S5. At step S5, the control device 5 determines whether the block "M500" is the magazine speed control command "M500." In this case, the control device 5 determines in the affirmative at step S5, advancing to stop S6 to set the magazine high-speed flag F1 and clear the magazine low-sped flag F2. The control device 5 then advances to step S7 whether the holding pots 21 are being rotated, based on the condition of the magazine motor 22. In this case, since the magazine motor 22 in stopped, the control device 5 determines in the negative ("NO"), advancing to step S8. At step S8, the control device 5 sets a driving sped Sh of the magazine motor 22, based on the block "M500." The control device 5 then advances to stop S9 to determine whether a next block is present in the NC program. Since the next block "T1" is present in the NC program, the control device 5 determine in the affirmative, advancing to step 82 in FIG. 1.

The control device 5 analyzes the next block "T1" at stop S2. Since the block "T1" which is a tool selecting command is not a magazine speed control command, the control device 5 determines in the negative at stop S2, then advancing to stop S7. Although the magazine motor 22 and accordingly the holding pots 21 are stopped, the control device 5 determines in the affirmative at step S7, based on the block "T1." The control device 5 then advances to step S10 to determine whether the magazine high-speed flag F1 has been set. Since the magazine high-speed flag F1 has already been set at step S6, the control device 5 determines in the affirmative at step S10, advancing to step S11. The control device 5 drives the magazine motor 22 at a set high speed Sh at step S11.

The control device 5 inputs the detection signal from the light sensing element 24b and starts an operation to select the tool 14 of tool number "1" at the tool selecting section 20d of the tool magazine 20. The control device 5 further determines at step S9 that a next block "G0X-100" is present in the NC program, returning to step S2 again. The control device 5 analyzes the block "G0X-100" at stop S2. Since the block "G0X-100" is a positioning command for moving the spindle to a next machining position, the control device 5 advances from step S3 to step S7. When the tool selecting operation has been finished and the holding pots 21 are stopped, the control device 5 determines in the negative at step S7. The control device 5 then advances to step S8 to carry out positioning based on the block "G0X-100."

On the other hand, when the holding pots 21 are moving during execution of the tool selecting operation, the control device 5 determines in the affirmative at step S10. Since the high-speed mode has been set, the control device 5 advances from step S10 to stop S11 to continue driving the magazine motor 22 at the high speed. Thereafter, the control device 5 advances to step S8 to carry out positioning in the state where the holding pots 21 are being moved at the high speed. The control device 5 determines at step S9 that a next block "G1Y-100" is present in the NC program, returning to step S2 again.

The control device 5 analyzes the block "G1Y-100" at step S2. The block "G1Y-100" is a linear interpolation command for linear cutting with movement. The control device 5 advances from step S3 to step S7. In this case, too, as in the came of the aforesaid positioning command, the control device 5 executes the linear interpolation immediately when the selection of the tool 14 has been finished. When the selection of the tool 14 is being performed, the control device 5 executes the linear interpolation while the holding pots 21 are being moved at the high speed. The linear interpolation performed under the high-speed moving condition of the holding pots 21 is limited particularly to machining not requiring precision. The linear interpolation is normally executed while the holding pots 21 are being moved at a low speed, as will hereinafter be described.

The speed control program shown in FIG. 1 will be described in relation with the blocks "M501" to "G1Y-100" in the NC program shown in FIG. 2. The control device 5 analyzes the block "M501" at step S2 and then advances to step S3 and further to step S4. When determining at step S4 that the magazine control command valid mode has been set, the control device 5 advances to step S5 and then to step S12. When determining at step S12 that the block "M501" in the magazine speed control command "M501," the control device 5 advances to step S13 to set the magazine low-speed flag F2 and to clear the magazine high-speed flag F1. Since the magazine motor 22 in stepped at this time, the control device 5 advances from step S7 to step S9 to set the drive speed Sl of the magazine motor 22 on the basis of the block "M501."

The control device 5 analyzes a next block "T2" at step S2 and determines in the negative at step S3, advancing to step S7. Although the magazine motor 22 is stepped, the control device 5 determines in the affirmative at step S7, advancing to step S10. In this case, since the magazine high-speed flag F1 has been cleared and the magazine low-speed flag F2 has been set at the previous step S13, the control device 5 advances from step S10 to steps S14 and S15. At step S15, the control device 5 determines whether a set value of the magazine low-speed moving speed Sl is "0." When determining that the set value is not "0," the control device 5 advances to step S16 to drive the magazine motor 22 at the set speed Sl, thereafter advancing to step S8. The control device 5 starts an operation for selecting the tool 14 of the tool number 2 at the tool selecting section 20d of the tool magazine 20.

On the other hand, when determining at step S15 that the set value of the speed Sl is 0, the control device 5 advances to step S17 to drive the magazine motor 22 to start the operation for selecting the tool 14 of the tool number 2 at the tool selecting section 20d of the tool magazine 20. Thereafter, the control device 5 is on standby at step S17 until the selecting operation is finished. Upon finish of the selecting operation, the control device 5 advances to step S19 to step drive of the magazine motor 22. The control device 5 then advances to steps S8, S9 and S2 sequentially. In this case, it is preferred that the magazine motor 22 is driven at the high sped.

The control device 5 returns to step S2 to analyze a next block "G0X-100" and then advances to steps S3 and S7. When the selection of the tool 14 has been finished, the control device 5 advances to step S8 to immediately execute positioning. On the other hand, when the selection of the tool 14 is being performed, the control device 5 advances from step S7 to steps S10, S14 and S15 sequentially. In this case, the control device 5 advances from step S7 to step S15 only when the magazine low-speed moving speed S1 is not "0." Accordingly, the control device determines in the negative at step S15 and then advances to step S16 to continue driving the magazine motor 22 at the low speed. Thereafter, the control device 5 advances to step S8 to perform positioning while the holding pots 21 are being moved at the low speed.

The control device 5 returns to step S2 to analyze the block "G1Y-100" and then advances from step S3 to step S7. When the selection of the tool 14 has been finished, the control device 5 advances to step S8 to immediately execute the linear interpolation. On the other hand, when the selection of the tool 14 in being performed, the control device 5 advances from step S7 to steps S10, S14 and S15 sequentially. In this case, too, as in the came of the positioning command, the control device 5 advances from step S7 to step S15 only when the magazine low-speed moving speed Sl is not "0." Accordingly, the control device determines in the negative at step S15 and then advances to step S16 to continue driving the magazine motor 22 at the low speed. Thereafter, the control device 5 advances to step S8 to perform the linear interpolation while the holding pots 21 are being moved at the low speed.

Further, the speed control program shown in FIG. 1 will be described in relation with the blocks "M502" to "G1Y-100" in the NC program shown in FIG. 2. The control device 5 analyzes the block "M502" at step S2 and then advances to step S3 and further to step S4. When determining at step S4 that the magazine control command valid mode has been set, the control device 5 advances to step S5 and then to step S12. When determining at steps S5 and S12 that the block "X502" in the magazine speed control commands "M500" and "M501" respectively, the control device 5 advances to step S19 to clear the magazine high-speed and low-speed flag F1 and F2. Since the magazine motor 22 is stopped at this time, the control device 5 advances from step S7 to step S8 to set the drive speeds Sh and Sl of the magazine motor 22 on the basis of the block "M502."

The control device 5 analyzes a next block "T3" at step S2 and determines in the negative at step S3, advancing to step S7. Although the magazine motor 22 is stepped, the control device 5 determines in the affirmative at step S7, advancing to step S10. In this case, since the magazine high-sped and low-speed flags F1 and F2 have been cleared at the previous step S19, the control device 5 advances from step S10 to steps S14 and S20.

Figure 3:
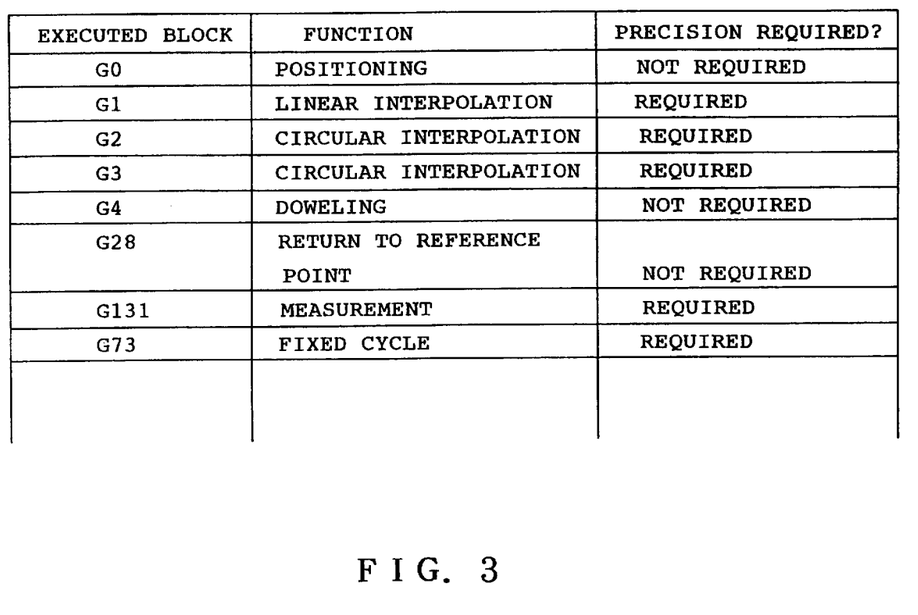
FIG. 3 shows the relationship between a type of machining and a machining precision.

The data table as shown in FIG. 3 is written on the ROK Sb of the control device 5. The data table shows G codes G0 to G131 indicative of the blocks to be executed in the NC program, the functions of the G codes and the require sat of precision in correlation, or example, blocks G1, G2 and G3 are those for commanding the linear or circular cutting with movement to the spindle 13. A high precision is required during machining. Further, the block G0 is for commanding positioning and the block G4 is for commanding interruption of machining. These blocks do not require precision. The control device 5 refers to the data table at step S20 to determine whether the block analyzed at step S2 requires high precision. Since the block is a tool access command "T3," the control device 5 determines in the negative at step S20, advancing to step S11. At step S11, the control device 5 drives the magazine motor 22 at the set speed Sh, thereafter advancing to step S8. The control device 5 starts an operation for selecting the tool 14 of the tool number 3 at the tool selecting section 20d of the tool magazine 20.

The control device 5 returns to step S2 to analyze a next block "G0X-100" and then advances to steps S3 and S7. When the selection of the tool 14 has been finished, the control device 5 advances to step S8 to immediately execute positioning. On the other hand, when the selection of the tool 14 is being performed, the control device 5 advances from step S7 to steps S10, S14 and S20 sequentially. The control device 5 refers to the data table shown in FIG. 3 at step S20. Consequently, the control device 5 drives that the block "G0X-100" does not require high precision, advancing to step S11 to continue driving the magazine motor 22 at the high speed. Thereafter, the control device 5 advances to step S8 to perform positioning while the holding pots 21 are being moved at the high speed.

The control device 5 returns to step S2 to analyze the block "G1Y-100" and then advances from step S3 to step S7. When the selection of the tool 14 has been finished, the control device 5 advances to step S8 to immediately execute the linear interpolation. On the other hand, when the selection of the tool 14 is being performed, the control device 5 advances from step S7 to steps S81, S14 and S20 sequentially. The control device 5 refers to the data table shown in FIG. 3 at step S20. Consequently, the control device 5 determines that the block "G0X-100" requires high precision, advancing to step S15. At step S15, the control device 5 determines whether a set value of the magazine low-speed moving speed Sl is 0.When determining that the set value is not 0, the control device 5 changes the magazine motor 22 to low-speed drive at step S16. Thereafter, the control device 5 advances to step S8 to perform the linear interpolation. On the other hand, when determining at step S15 that the set value is 0, the control device 5 advances to step S17 to be on standby for selection of the tool 14 of tool number 3. Upon finish of the selection, the control device 5 advances to step S8 to perform the linear interpolation in a state where the holding pots 21 are stepped.

When determining at step S4 that the magazine speed control invalid mode has been not, the control device 5 advances from step S4 to step S7 to perform the same control as in the above-described execution of the magazine spend command "M502." More specifically, when the selection of the tool 14 in being executed, the control device 5 advances to step S10, S14 and S20 sequentially. At step S20, the control device 5 determines whether the block analyzed on the basis of the data table shown in FIG. 3 requires high precision. Based on a result of determination, the control device 5 controls the feed sped of the tool 14 in the tool magazine 20.

According to the above-described embodiment, the feeding speed of the tool 14 is automatically controlled at the time of tool selection (automatic mode) when the magazine speed control command invalid mode has been set or when the magazine speed control command valid mode has been set and the magazine speed control command "M502" is executed. In other words, the feeding speed of the tool 14 is automatically set to the low speed or zero when the tool is selected in the case of machining requiring high precision, for example, the block "G1" (linear interpolation) or the block "G131" (measurement). Consequently, since the vibration due to the feeding of the tool 14 is decreased, a reduction in the machining precision can be prevented. Particularly when the tool feeding speed is set to the low speed, the tool selection does not retard the start of the next machining. Consequently, an increase in the machining time can be prevented. On the other hand, the tool feeding speed is automatically set to the high speed when the tool selection is carried out in the case of machining not requiring the high precision, for example, the block "G0" (positioning) or the block "G4" (doweling). Consequently, an increase in the machining time due to the tool selection can be restrained.

In the magazine speed control coamand valid mode, the control device 5 can control the tool feeding speed during the tool selection on the basis of the magazine speed control commands "M500," "M501" and "M502" in the NC program. Accordingly, the tool feeding speed during the tool selection is automatically controlled according to the magazine speed control command. Consequently, the usability of the machine tool can be improved. Further, with the use of the magazine speed control command, the tool feeding sped can be controlled more precisely according to the precision required in each machining. Particularly when the tool 14 is fed at the low speed to the tool selecting section 20d, the tool selection is not sometimes finished in spite of completion of the machining. In this case, the magazine speed control command "M500" in input so that the tool 14 is fed at the high speed. Consequently, the tool selection can be finished on or before completion of the machining.

The magazine speed control valid and invalid modes are set by means of parameters such that the magazine speed control commands "M500" or "M501" can selectively be validated. Accordingly, when the NC program shown in FIG. 2 is used for generation of another NC program, the operator operates the keyboard 3 or 6c to change the machine tool to the magazine speed control invalid mode.

Thus, the machine tool can readily be set to the automatic node without correction of the NC program. Further, the control device 5 can set the feeding speed Sh of the tool 14 in the high-speed mode and the feeding speed Sl of the tool 14 in the low-speed mode. Consequently, the feeding speed of the tool 14 can be adjusted precisely and the usability of the machine tool can be improved.

The control device 5 inputs the NC program from the personal computer 6 in the foregoing embodiment. However, the control device 5 may input the NC program from an external storage device such as a floppy disk or through a telephone communication line from the external storage device, instead. Further, although the magazine high-speed and low-sped moving speeds Sh and Sl are set to any values in the foregoing embodiment, these speeds may be fixed to respective standard high-speed and low-speed values so that the operator cannot set them, instead.

The data table shown in FIG. 3 is previously written on the ROM 5b of the control device 5 in the foregoing embodiment. However, for example, the display device 4 of the operation panel 2 or the display device 6d of the personal computer 6 may display a setting screen, and the keyboard 3 of the operation panel 2 or the keyboard 6c of the personal computer 6 may be operated so that the operator can set as to whether a block requires high precision.

The feed control program and the speed control program are previously written on the ROM 5b of the control device 5 in the foregoing embodiment. However, for example, the feed and speed control program may previously be written on an external recording medium such an the hard disk 6b, a floppy disk, a CD-ROM or an IC card, and the control device 5 may read out these program from the external recording medium to use them. In this case, the data table shown in FIG. 3 may also be written onto the external recording medium.

The control device 5 selects the magazine control command valid or invalid mode, based on the contents of operation of the keyboards 3 and 6c, in the foregoing embodiment. However, for example, the magazine control command valid and invalid modes may be set by means of parameters in the NC program. Alternatively, a switch provided for dedicated use may be turned on and off so that the magazine control command valid or invalid mode in set.

In the foregoing embodiment, when the magazine low-speed moving sped Sl in 0, the tool 14 not in the NC program is fed to the tool selecting section 20 and then stepped. Thereafter, the machining is executed. However, when priority is given to the machining, a tool 14 differing from the one set in the NC program may be stepped at the tool selecting section 20 during the tool selecting operation, so that the machining is immediately executed. In this case, the tool selecting operation in preferably re-performed after completion of the machining. Further, the numerical control (NC) device in provided for carrying out the machining operation on the basis or the NC program in the forgoing embodiment. However, the invention may be applied to a machine tool in which the machining is automatically carried out on the basis of data designed by a CAD.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A machine tool comprising:

a tool magazine for accommodating a plurality of tools, the tool magazine including a tool ejecting section;

feeding means for selectively feeding one of the tools accommodated in the tool magazine to the tool ejecting section of the tool magazine; and feed control means for controlling the feeding means so that a feeding speed of the feeding means is set on the basis of a type of a machining operation executed during feed of the tool.

2. A machine tool according to claim 1, wherein the feed control means sets the feeding speed of the feeding means at a low speed or zero when a machining operation requiring high precision is executed during feed of the tool.

3. A machine tool according to claim 2, wherein the machining operation requiring high precision in an interpolation, measurement or a fixed cycle.

4. A machine tool according to claim 2, wherein the feed control means sets the feeding speed of the feeding means at a high speed when a machining operation not requiring high precision in executed during feed of the tool.

5. A machine tool according to claim 4, wherein the machining operation not requiring high precision is positioning, doweling or return to a reference position.

6. A machine tool according to claim 4, wherein the feed control means sets either a low feeding speed or a high feeding speed.

7. A machine tool according to claim 1, wherein the feed control mean is switched to a control mode of setting the feeding speed on the basis of a speed control command contained in an NC program.

8. A machine tool comprising:

a tool magazine for accommodating a plurality of tools, the tool magazine including a tool ejecting section;

feeding means for selectively feeding one of the tools accommodated in the tool magazine to the tool ejecting section of the tool magazine; and feed control means for controlling the feeding means so that a feeding speed of the feeding means is set on the basis of a speed control command contained in an NC program.

9. A machine tool according to claim 8, wherein the speed control command includes a low-speed mode setting command on which the tool is fed at a low speed, a high-speed mode setting command on which the tool is fed at a high speed, and an automatic mode setting command on which the tool is fed at either the low speed or the high speed according to a type of a machining operation executed during feed of the tool.

10. A machine tool according to claim 9, wherein the feed control means sets the feeding speed of the feeding means to each of the high and low speeds.

11. A recording medium for recording a program for operating a machine tool provided with a tool magazine, the program accomplishing the function of varying, on the basis of a type of a machining operation executed by the machine tool, a feeding speed at which one of a plurality of tools accommodated in the tool magazine is fed.

12. A recording medium according to claim 11, wherein the feed control means sets the feeding speed of the feeding means at a low speed or zero when a machining operation requiring high precision is executed during feed of the tool.

13. A recording medium according to claim 12, wherein the feed control means sets the feeding speed of the feeding means at a high speed when a machining operation not requiring high precision is executed during feed of the tool.

14. A recording medium according to claim 13, on which is further recorded a data table for correlating a machining operation performed by the machine tool with one requiring high precision or one not requiring high precision.

15. A recording medium according to claim 11, wherein the feed control means is switched to a control mode of setting the feeding speed on the basis of a speed control command contained in an NC program.

* * * * *